United States Patent
Schüssler et al.

(10) Patent No.: US 9,692,030 B2
(45) Date of Patent: Jun. 27, 2017

(54) BATTERY MODULE AND METHOD FOR THE PRODUCTION THEREOF

(71) Applicant: AUDI AG, Ingolstadt (DE)

(72) Inventors: Martin Schüssler, Kösching (DE); Christian Allmann, Ingolstadt (DE)

(73) Assignee: Audi AG, Ingolstadt (DE)

( * ) Notice: Subject to any disclaimer, the term of this patent is extended or adjusted under 35 U.S.C. 154(b) by 46 days.

(21) Appl. No.: 14/426,664

(22) PCT Filed: Jun. 12, 2013

(86) PCT No.: PCT/EP2013/001728
§ 371 (c)(1),
(2) Date: Mar. 6, 2015

(87) PCT Pub. No.: WO2014/040666
PCT Pub. Date: Mar. 20, 2014

(65) Prior Publication Data
US 2015/0228956 A1   Aug. 13, 2015

(30) Foreign Application Priority Data

Sep. 15, 2012   (DE) .................. 10 2012 018 344

(51) Int. Cl.
| | | |
|---|---|---|
| *H01M 10/6554* | (2014.01) | |
| *H01M 10/6553* | (2014.01) | |
| *H01M 10/65* | (2014.01) | |
| *H01M 10/625* | (2014.01) | |
| *H01M 10/613* | (2014.01) | |
| *H01M 10/60* | (2014.01) | |
| *H01M 2/26* | (2006.01) | |

(Continued)

(52) U.S. Cl.
CPC ......... *H01M 2/206* (2013.01); *H01M 2/1077* (2013.01); *H01M 10/049* (2013.01); *H01M 2220/20* (2013.01); *Y10T 29/4911* (2015.01); *Y10T 29/49108* (2015.01)

(58) Field of Classification Search
None
See application file for complete search history.

(56) References Cited

U.S. PATENT DOCUMENTS

| | | | | |
|---|---|---|---|---|
| 4,397,919 A | * | 8/1983 | Ballard ............... | H01M 2/0232 429/53 |
| 2009/0004556 A1 | * | 1/2009 | Al-Hallaj .......... | H01M 10/4207 429/120 |
| 2013/0052506 A1 | * | 2/2013 | Gutsch .................. | H01M 2/202 429/120 |

FOREIGN PATENT DOCUMENTS

| | | |
|---|---|---|
| CN | 101859912 | 10/2010 |
| CN | 102544622 | 7/2012 |

(Continued)

OTHER PUBLICATIONS

Rohatgi et al, The Synthesis, Compressive Properties, and Applications of Metal Matrix Syntactic Foams, 36-42 JOM vol. 63, No. 2 (2011).*

(Continued)

*Primary Examiner* — Yoshitoshi Takeuchi
(74) *Attorney, Agent, or Firm* — Henry M. Feiereisen, LLC

(57) ABSTRACT

A method for producing a battery module having a plurality of individual electrochemical cells, includes the following steps: —arranging cell cans; —embedding the cell cans in a metal foam; and —inserting cell coils into the cell cans. The metal foam is used hereby as common negative pole or positive pole of the single cells.

5 Claims, 1 Drawing Sheet

(51) Int. Cl.
*H01M 2/24* (2006.01)
*H01M 2/22* (2006.01)
*H01M 2/20* (2006.01)
*H01M 2/10* (2006.01)
*H01M 10/04* (2006.01)

(56) References Cited

FOREIGN PATENT DOCUMENTS

| | | | | |
|---|---|---|---|---|
| CN | 102790246 | 11/2012 | | |
| DE | 600 28 409 | 1/2007 | | |
| DE | 10 2009 001 592 | 9/2010 | | |
| DE | 10 2009 025 579 | 12/2010 | | |
| DE | 10-2009-025579 | * 12/2010 | ............. | H01M 2/22 |
| EP | 1 104 050 | 5/2001 | | |
| JP | 2011-150902 | 8/2011 | | |

OTHER PUBLICATIONS

International Search Report issued by the European Patent Office in International Application PCT/EP2013/001728.
Chinese Search Report issued on Jun. 13, 2016 with respect to counterpart Chinese patent application 201380047707.1.
Translation of Chinese Search Report issued on Jun. 13, 2016 with respect to counterpart Chinese patent application 201380047707.1.

* cited by examiner

BATTERY MODULE AND METHOD FOR THE PRODUCTION THEREOF

CROSS-REFERENCES TO RELATED APPLICATIONS

This application is the U.S. National Stage of International Application No. PCT/EP2013/001728, filed Jun. 12, 2013, which designated the United States and has been published as International Publication No. WO 2014/040666 and which claims the priority of German Patent Application, Serial No. 102012018344.5, filed Sep. 15, 2012, pursuant to 35 U.S.C. 119(a)-(d).

BACKGROUND OF THE INVENTION

The invention relates to a method for the production of a battery module having several single electrochemical cells.

In traction batteries for electric vehicles, batteries are increasingly used with single electrochemical cells which may involve e.g. lithium-ion cells. Such single cells may have a cylindrical cell can as casing, in which a cell coil is inserted.

DE 10 2009 001 592 A1 describes a battery module having single cells which are embedded in an open-pore porous solid body. The solid body may be a metal foam, with heat generated during operation of the single cell being dissipated via the metal foam.

DE 10 2009 025 579 discloses a battery module having single cells. A single cell has a current collector which contacts a connecting pin that is enclosed by a metal foam.

In addition, other methods are known to contact the positive poles and the negative poles of the single electrochemical cell, a copper plate, for example, can be used for that purpose. However, welds are produced hereby by a laser welding process, the process parameters of which need to be closely monitored. This method requires therefore a very precise process control for use in single electrochemical cells.

SUMMARY OF THE INVENTION

The invention is therefore based on the object to provide a method for the production of a battery module having several single electrochemical cells, which method has high process reliability and can be executed in a simple and inexpensive manner.

This object is attained in accordance with the invention provided by a method of the afore-described type with the following steps:
arranging cell cans,
embedding the cell cans in a metal foam, and
inserting cell coils in the cell cans.

The invention is based on the recognition that it is possible to eliminate the need for a separate common negative pole or positive pole for the single cells by using the metal foam, which encloses the cell cans, as negative pole or positive pole.

Since in the method according to the invention, the empty cell cans are embedded in the metal foam, there is no risk of damage to the cell coils by the high temperatures encountered during the production of the metal foam. Single cells can only be thermally exposed to about 80° C.; however, much higher temperatures are encountered during the production of a metal foam, so that respective recesses had to be provided heretofore for insertion of the single cells. Instead, in the method according to the invention, empty cell cans are initially arranged and embedded in the metal foam, subsequently, once the metal foam has cooled, cell coils are inserted into the cell cans to thereby create the single cells.

In the method according to the invention, it is particularly preferred to use cell cans of an electrically conductive material which are directly enclosed by the metal foam. Examples for the electrically conductive material include steel, aluminum, copper, and alloys thereof. These materials exhibit good conductivity. A cell coil has two contacts (positive pole and negative pole), after insertion of the cell coil in a cell can, a contact, typically the negative pole, is automatically connected with the electrically conductive cell can and with the electrically conductive metal foam via the cell can. Accordingly, all cell coils and thus all single cells are electrically interconnected, when the cell coils are inserted in the cell cans, so that a common negative pole or a common positive pole is established for several or all single cells of a battery module.

According to a refinement of the invention, the cell cans are closed by a cover after the cell coils have been inserted. The respective other pole, normally the positive pole of the single cells, can be situated above the cover. The positive poles of the plurality of single cells can be interconnected by a plate of a conductive material or by a printed circuit board or the like having contacts.

In addition, the invention relates to a battery module having several single electrochemical cells embedded in a metal foam and having each a cell coil arranged in a cell can.

The battery module according to the invention is characterized in that the single cells have cell cans made of an electrically conductive material and being directly enclosed by the metal foam.

With respect to the metal foam of the battery module according to the invention, it is preferred that the metal foam is made of aluminum or an aluminum alloy. Such metal foams are characterized by a low density, while at the same time ensuring good heat conduction, so that heat generated during charging and discharging of single cells can be dissipated via the cell can and the metal foam.

According to a refinement of the invention, the metal foam can include at least one filler such as hollow glass beads, which may, optionally, be filled with a phase change material. The provision of a filler such as hollow glass beads results in a reduction in the density. When the hollow glass beads are filled with a phase change material, the heat storage capability of the metal foam is significantly increased. As an alternative, the phase change material can be incorporated directly into the voids of the metal foam.

Further embodiments of the invention are described in the subclaims.

BRIEF DESCRIPTION OF THE DRAWING

An exemplary embodiment of the invention will now be explained with reference to the drawings. The drawings are schematic views and show.

DETAILED DESCRIPTION OF PREFERRED EMBODIMENTS

Figure 1:
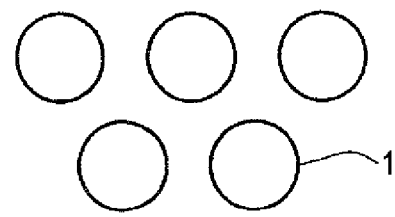
FIG. 1 the arrangement of cell cans.

FIG. 1 shows schematically the first step of the method for the production of a battery module having several single electrochemical cells and having arranged thereon several tubular cell cans 1. The cell cans 1 are arranged in multiple staggered rows so that the available space is well-utilized. The individual cell cans are spaced by a fixed distance there between. The cell cans 1 are open at the top and made of an electrically conductive material, in the illustrated exemplary embodiment of aluminum.

Figure 2:
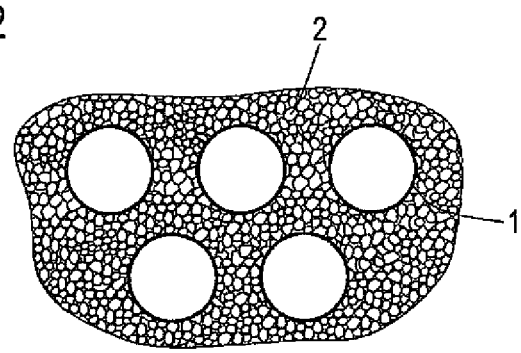
FIG. 2 the embedding of the cell cans in a metal foam.

FIG. 2 shows the next step of the method for the production of the battery module. The cell cans 1 are embedded in a porous metal foam 2 which is made from an aluminum alloy.

As the metal foam 2 undergoes foaming, high temperatures are encountered which, however, do not lead to an impairment of the empty cell cans 1. After the foaming process, the cell cans 1 encased in foam are allowed to cool down, at least until a temperature for the cell coils drops below a critical temperature of 80° C. The further processing of the cell cans 1 encased in foam can also be realized after a cool down to room temperature.

Since both the cell cans 1 and the metal foam 2 are electrically conductive, electrical contacting is established automatically.

Figure 3:
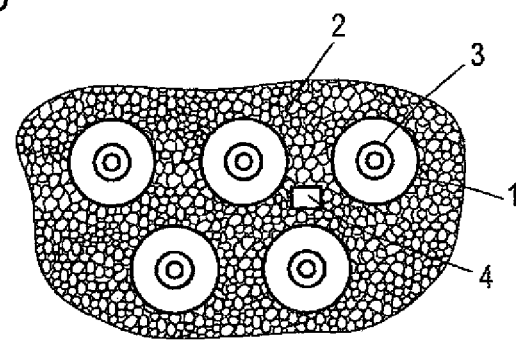
FIG. 3 the insertion of cell coils in the cell cans.

FIG. 3 shows that the next step of the production of the battery module involves insertion of cell coils 3 into the cell cans 1. A cell coil 3 is an electrode stack having an anode layer, a cathode layer, and a separator layer. Optionally, several such layers are present in a cell coil. Each cell coil 3 has a negative pole and a positive pole. A cell coil 3 is hereby configured such that its negative pole touches the cell can 1 after being inserted in a cell can 1, so that the negative poles of all cell coils 3 are electrically connected with each other via the cell cans 1 and the metal foam 2. As a result, there is no need to attach a separate negative pole or a corresponding contact for each individual cell coil 3; instead an area of the metal foam 2 can be used as a common negative pole 4.

Figure 4:
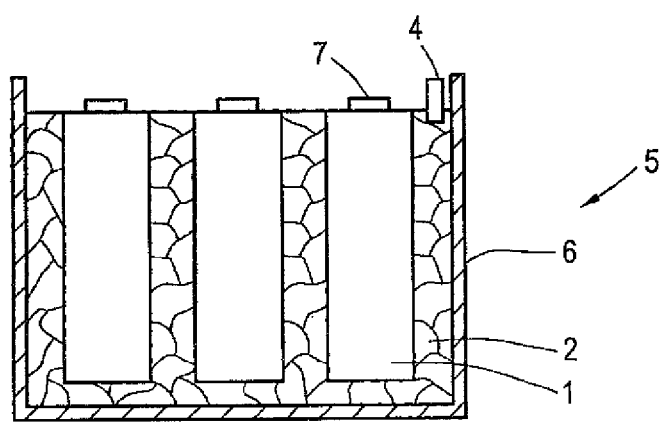
FIG. 4 a battery module produced by the method according to the invention.

FIG. 4 shows a sectional view of a battery module. The battery module 5 includes a housing 6, which is filled with the metal foam 2 which encloses the individual cell cans 1. Arranged on top of the battery module 5 is the negative pole 4; the contacting of the plurality of positive poles 7 of the single cells is realized via a contact plate (not shown). The metal foam 2 is filled with hollow glass beads in which a phase change material is accommodated.

What is claimed is:

1. A battery module, comprising:
   a plurality of single electrochemical cells embedded in a metal foam,
   each said cell including a cell can made of an electrically conductive material including steel, aluminum, copper, and alloys thereof, and said cell can directly enclosed by the metal foam,
   wherein the metal foam is made of an aluminum alloy, and
   a cell coil arranged in the cell can,
   said metal foam establishing a common negative pole or positive pole of the single cells.

2. The battery module of claim 1, further comprising a cover configured to close the cell cans.

3. The battery module of claim 1, wherein the metal foam has at least one filler.

4. The battery module of claim 3, wherein the at least one filler includes hollow glass beads.

5. The battery module of claim 4, wherein the hollow glass beads are filled with a phase change material.

* * * * *